(12) United States Patent
Miyoshi et al.

(10) Patent No.: US 12,280,974 B2
(45) Date of Patent: Apr. 22, 2025

(54) TAPE SUPPLY DEVICE, OPTICAL CABLE MANUFACTURING APPARATUS, AND OPTICAL CABLE MANUFACTURING METHOD

(71) Applicant: SUMITOMO ELECTRIC INDUSTRIES, LTD., Osaka (JP)

(72) Inventors: Shogo Miyoshi, Osaka (JP); Fumikazu Yoshizawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/457,851

(22) Filed: Aug. 29, 2023

(65) Prior Publication Data
US 2024/0067483 A1    Feb. 29, 2024

(30) Foreign Application Priority Data
Aug. 30, 2022   (JP) ................. 2022-137186

(51) Int. Cl.
 *B65H 23/188* (2006.01)
 *B65H 20/34* (2006.01)
 *G02B 6/44* (2006.01)

(52) U.S. Cl.
 CPC .......... *B65H 23/188* (2013.01); *B65H 20/34* (2013.01); *B65H 23/1888* (2013.01); *B65H 2403/725* (2013.01); *B65H 2408/217* (2013.01); *B65H 2701/32* (2013.01); *G02B 6/4479* (2013.01); *G02B 6/4486* (2013.01)

(58) Field of Classification Search
 CPC ...... B65H 23/00; B65H 23/10; B65H 23/105; B65H 23/14; B65H 23/16; B65H 23/188; B65H 23/1882; B65H 23/1884; B65H 23/1888; B65H 23/26; B65H 20/30; B65H 20/34; B65H 2408/21; B65H 2408/217; B65H 2408/2171; B65H 2408/2172; B65H 2408/2173; B65H 2701/32; B65H 2701/37; B65H 2701/376; B65H 2701/377; B65H 2403/725; G02B 6/4479; G02B 6/4486; H01B 13/26; H01B 13/2613
 See application file for complete search history.

(56) References Cited

U.S. PATENT DOCUMENTS 3,841,545 A  * 10/1974 Gingher, Jr. ........... B65H 23/16
                                                           226/1
4,009,814 A  *  3/1977 Singh ..................... B65H 20/34
                                                        226/118.2

(Continued)

FOREIGN PATENT DOCUMENTS

EP    0173582 A2  *  3/1986  ........... G02B 6/4486
GB  2619787 A  * 12/2023  ........... B05B 12/126

(Continued)

*Primary Examiner* — Michael R Mansen
*Assistant Examiner* — Raveen J Dias
(74) *Attorney, Agent, or Firm* — MCDONALD HOPKINS LLC

(57) ABSTRACT

A tape supply device that supplies a tape to an optical cable, the tape supply device includes: an accumulator unit of a multistage unit type divided into units, each of the units including a plurality of movable rollers and a plurality of fixed rollers, the units being connected in series; and a control unit configured to control a supply order of the tape from the units.

6 Claims, 4 Drawing Sheets

(56) References Cited

U.S. PATENT DOCUMENTS

| | | | | |
|---|---|---|---|---|
| 4,168,776 | A * | 9/1979 | Hoeboer | B65H 19/305 198/797 |
| 4,360,137 | A * | 11/1982 | Noe | B65H 18/103 242/417.3 |
| 4,379,615 | A * | 4/1983 | Toda | H02G 11/02 242/388.6 |
| 4,446,686 | A * | 5/1984 | Panuska | G02B 6/4479 385/100 |
| 4,460,430 | A * | 7/1984 | Kissell | B65H 19/1863 242/552 |
| 4,771,621 | A * | 9/1988 | Sato | B21B 41/12 72/8.6 |
| 4,886,199 | A * | 12/1989 | Noe | B21C 49/00 226/118.2 |
| 4,930,672 | A * | 6/1990 | Renzo | B65H 20/34 226/118.3 |
| 5,320,266 | A * | 6/1994 | Noe | B65H 20/34 318/7 |
| 5,322,228 | A * | 6/1994 | Nagayama | B65H 57/003 242/487.3 |
| 5,991,485 | A * | 11/1999 | Kertscher | G02B 6/4486 385/100 |
| 6,327,767 | B1 * | 12/2001 | Puhakka | G02B 6/4479 29/714 |
| 6,340,126 | B1 * | 1/2002 | McAlpine | B65H 59/387 242/603 |
| 2003/0052148 | A1 * | 3/2003 | Rajala | B65H 23/063 226/44 |
| 2005/0139713 | A1 * | 6/2005 | Weber | B65H 20/34 226/118.3 |
| 2007/0017952 | A1 * | 1/2007 | Carnevale | B65H 20/34 226/3 |
| 2008/0193090 | A1 * | 8/2008 | Riddett | G02B 6/4486 65/529 |
| 2010/0138036 | A1 * | 6/2010 | Schulze | B65H 20/34 700/230 |
| 2017/0096017 | A1 * | 4/2017 | Fernando | B41J 11/0005 |
| 2018/0057293 | A1 * | 3/2018 | Shigehara | B65H 20/34 |
| 2018/0079615 | A1 * | 3/2018 | Shigehara | B65H 23/1888 |
| 2019/0010013 | A1 * | 1/2019 | Suzuki | G02B 6/4458 |
| 2020/0011763 | A1 * | 1/2020 | Suzuki | G02B 6/4457 |
| 2020/0216281 | A1 * | 7/2020 | Raul | B65H 21/00 |
| 2020/0299178 | A1 * | 9/2020 | Arai | C03C 25/105 |
| 2021/0163253 | A1 * | 6/2021 | Bednarczyk | B65H 65/00 |
| 2023/0134473 | A1 * | 5/2023 | Blackburn | B65H 61/00 29/428 |
| 2024/0083086 | A1 * | 3/2024 | Nijland | B29C 48/355 |

FOREIGN PATENT DOCUMENTS

| | | | | |
|---|---|---|---|---|
| JP | | 2924709 B2 * | 7/1999 | B65H 20/34 |
| JP | | 2005-126221 A | 5/2005 | |
| KR | | 200143908 Y1 * | 6/1999 | B65H 20/34 |

* cited by examiner

TAPE SUPPLY DEVICE, OPTICAL CABLE MANUFACTURING APPARATUS, AND OPTICAL CABLE MANUFACTURING METHOD

TECHNICAL FIELD

The present disclosure relates to a tape supply device, an optical cable manufacturing apparatus, and an optical cable manufacturing method. This application claims priority based on Japanese Patent Application No. 2022-137186 filed on Aug. 30, 2022, and the entire contents of which are incorporated herein by reference.

BACKGROUND ART

An optical cable is provided with, outside a cable core, a wrap tape and a sheath. When the tape is longitudinally wrapped on an outer periphery of the cable core, the tape is supplied from a bobbin or the like. When a cable to be manufactured has a length larger than a supply length (remaining length) of the tape, it is necessary to replace the bobbin of the tape. In order to continuously supply the tape even during the replacement of the bobbin, an accumulator that can store the tape in advance is used.

For example, JP2005-126221A discloses an accumulator that stores a tape by alternately passing the tape between a fixed roller group and a movable roller group. When the tape is replenished, the movable roller group is moved to approach the fixed roller group to supply the tape stored in the accumulator, and thereby the tape can be continuously supplied even during the replenishment of the tape.

SUMMARY

An aspect of the present disclosure is a tape supply device that supplies a tape to an optical cable, the tape supply device includes:
  an accumulator unit of a multistage unit type divided into units, each of the units including a plurality of movable rollers and a plurality of fixed rollers, the units being connected in series; and
  a control unit configured to control a supply order of the tape from the units.

DESCRIPTION OF EMBODIMENTS

Figure 1:
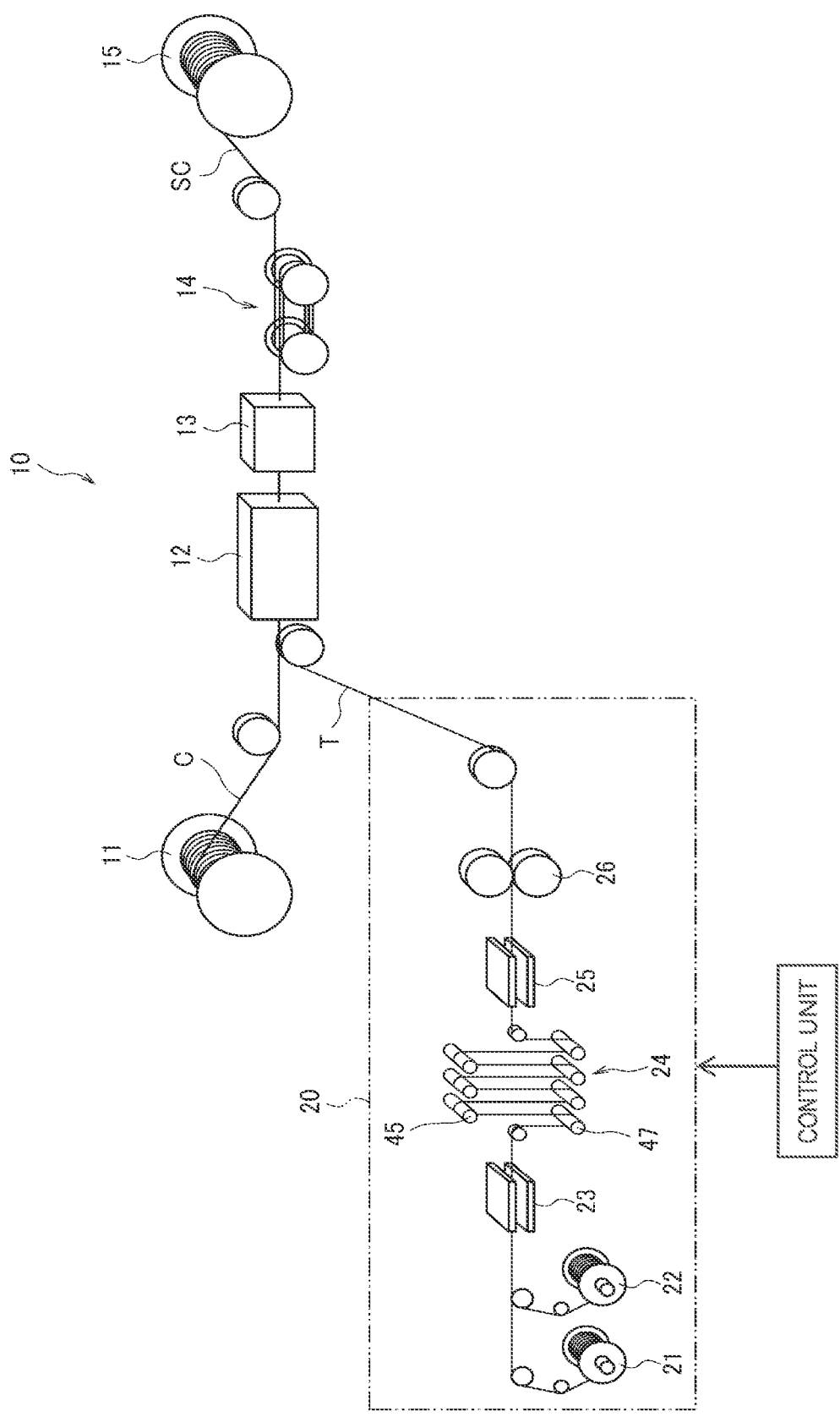
FIG. 1 shows an optical cable manufacturing apparatus.

The accumulator disclosed in JP2005-126221A uses a movable roller group including plural rollers and a fixed roller group including plural rollers, and therefore, the tape stored in the accumulator can be continuously supplied even during the replacement of the bobbin at the time of the tape replenishment. However, when the number of back-and-forth movements of the tape is large, the tape may be twisted in the middle and cause poor running.

The present disclosure is to solve the above-described technical problem in the related art, and an object of the present disclosure is to provide a tape supply device, an optical cable manufacturing apparatus, and an optical cable manufacturing method that can stabilize running of a tape while supplying the tape using an accumulator.

According to the above configuration, it is possible to provide a tape supply device, an optical cable manufacturing apparatus, and an optical cable manufacturing method that can stabilize running of a tape while supplying the tape using an accumulator.

Description of Embodiments of Present Invention

First, contents of embodiments of the present disclosure will be listed and described.

(1) According to the present disclosure, there is provided a tape supply device that supplies a tape to an optical cable. The tape supply device includes: an accumulator unit of a multistage unit type divided into units, each of the units including a plurality of movable rollers and a plurality of fixed rollers, the units being connected in series; and a control unit configured to control a supply order of the tape from the units.

In this manner, since the accumulator unit a multistage unit type including units connected in series is provided, the running of the tape can be stabilized.

(2) In the tape supply device according to (1), the tape may be a longitudinal wrap tape.

In this manner, the longitudinal wrap tape can be supplied as the tape. Accordingly, when the tape supply device according to the present disclosure is used in an optical cable manufacturing apparatus, the longitudinal wrap tape to be longitudinally wrapped on an outer periphery of a cable core can be constantly supplied even during replacement of a bobbin of the tape.

(3) In the tape supply device according to (1) or (2), each of the units may include a brake configured to stop the movable rollers, and when the units are switched, the control unit may perform control such that the brakes of two of the units before and after the switching do not operate simultaneously.

By controlling the brakes of two of the units before and after the switching not to operate simultaneously, the two units can be prevented from being simultaneously stopped at the time of switching the units, the tape can be prevented from a large tension, and the tape can be prevented from being cut off.

(4) In the tape supply device according to any one of (1) to (3), the movable rollers of each of the units may be attached to a weight that controls tension of the tape, and the weight of each of the units may differ in weight.

When the brakes of two of the units before and after the switching do not simultaneously operate at the time of switching the units, it is possible to select the unit to use up the tape first by differentiating the weight of each of the units in weight.

(5) In the tape supply device according to any one of (1) to (4), the number of turns of the tape by the movable rollers and the fixed rollers of each of the units may be five back-and-forth movements or less.

When the number of turns of the tape by the movable rollers and the fixed rollers of each of the units is excessively large, the tape may be twisted and cause poor running. By making the number of turns of the tape by the movable rollers and the fixed rollers of each of the units to be five back-and-forth movements or less, the tape tension and the running of the tape in each of the units can be stabilized.

An optical cable manufacturing apparatus of the present disclosure may use the tape supply device according to any one of (1) to (5).

Accordingly, it is possible to provide an optical cable manufacturing apparatus having the same effect as (1).

An optical cable manufacturing method of the present disclosure may use the tape supply device according to any one of (1) to (5).

Accordingly, it is possible to provide an optical cable manufacturing method having the same effect as (1).

Details of Embodiments of Present Invention

Hereinafter, a tape supply device, an optical cable manufacturing apparatus, and an optical cable manufacturing method according to embodiments of the present disclosure will be described with reference to the drawings. The embodiments described below are examples of a tape supply device, an optical cable manufacturing apparatus, and an optical cable manufacturing method for embodying the technical idea of the present disclosure, the present disclosure is not limited thereto, and can be equally applied to other embodiments included in the scope of the claims.

First Embodiment

A tape supply device, an optical cable manufacturing apparatus, and an optical cable manufacturing method according to a first embodiment of the present disclosure will be described with reference to FIGS. 1 to 4.

1. Optical Cable Manufacturing Apparatus

First, the optical cable manufacturing method and the optical cable manufacturing apparatus according to the first embodiment of the present disclosure will be described with reference to FIG. 1. FIG. 1 shows an optical cable manufacturing apparatus. An optical cable SC is manufactured in units of kilometers, for example. In contrast, a longitudinal wrap tape T wrapped on a bobbin may have a length smaller than the length of the cable to be manufactured. In this case, it is necessary to replace the bobbin while supplying the longitudinal wrap tape T to a cable core C. A tape supply device 20 includes an accumulator unit 24 so that the longitudinal wrap tape T can be continuously supplied even during the replacement of the bobbin and the optical cable SC can be continuously manufactured.

An optical cable manufacturing apparatus 10 includes a cable core supply 11, the tape supply device 20, a tape winder 12, a sheath extruding machine 13, a capstan 14, and a winding machine 15.

The tape winder 12 is supplied with the cable core C from the cable core supply 11 and the longitudinal wrap tape T from the tape supply device 20. In the tape winder 12, the longitudinal wrap tape T is longitudinally wrapped on the cable core C. After the cable core C is coated with the longitudinal wrap tape T in the tape winder 12, the sheath is extruded around the longitudinal wrap tape T in the sheath extruding machine 13. The sheath is not particularly limited, and is made of a resin material such as a flame-retardant polyethylene resin.

The optical cable SC whose sheath is extruded in the sheath extruding machine 13 is carried by the capstan 14 and wound around a bobbin by the winding machine 15.

The tape supply device 20 includes a first bobbin 21, a second bobbin 22, a first tape catcher 23, the accumulator unit 24, a second tape catcher 25, and a capstan 26.

The longitudinal wrap tape T is supplied from one of the first bobbin 21 and the second bobbin 22 (for example, the first bobbin 21), and the other bobbin (for example, the second bobbin 22) is a replacement bobbin. When the amount of the longitudinal wrap tape T wrapped on the first bobbin 21 is smaller than a predetermined amount, the longitudinal wrap tape T is gripped by the first tape catcher 23 on an inlet side of the accumulator unit 24. At the same time as or before the first tape catcher 23 grips the longitudinal wrap tape T, movable rollers 45 are unlocked.

When the longitudinal wrap tape T is gripped by the first tape catcher 23 on the inlet side of the accumulator unit 24, the longitudinal wrap tape T stored by alternately passing between a plurality of movable rollers 45 and a plurality of fixed rollers 47 of the accumulator unit 24 is carried by the capstan 26 from an outlet of the accumulator unit 24 and supplied to the tape winder. For this reason, even when the longitudinal wrap tape T is gripped by the first tape catcher 23 due to the replacement of the bobbin, the longitudinal wrap tape T stored in the accumulator unit 24 can be continuously supplied to an outlet side, and the optical cable SC can be continuously manufactured.

After the longitudinal wrap tape T is gripped by the first tape catcher 23, the longitudinal wrap tape T of the first bobbin 21 is cleaved, and a front end of the longitudinal wrap tape T of the second bobbin 22 is bonded to a rear end of the longitudinal wrap tape T gripped by the first tape catcher 23.

After the bonding of end portions of the two longitudinal wrap tapes T is completed, the grip of the longitudinal wrap tape T by the first tape catcher 23 is released, and the supply of the longitudinal wrap tape T from the second bobbin 22 to the accumulator unit 24 is restarted. When the supply of the longitudinal wrap tape T from the second bobbin 22 to the accumulator unit 24 is restarted, the supply of the longitudinal wrap tape T from the accumulator unit 24 to the tape winder 12 is continued, and the longitudinal wrap tape T is stored again in the accumulator unit 24.

The second tape catcher 25 is provided between the accumulator unit 24 and the capstan 26. The second tape catcher 25 can grip the longitudinal wrap tape T on the outlet side of the accumulator unit 24 at the end of manufacturing the optical cable SC, during maintenance of the optical cable manufacturing apparatus 10, and during maintenance of the accumulator unit 24.

In the optical cable manufacturing apparatus 10 according to the present embodiment, a paper tape for a wrapping tape is described as the longitudinal wrap tape T. Alternatively, the longitudinal wrap tape T in the present disclosure is not limited to a paper tape, and the accumulator unit 24 handles various types of tapes T such as a resin tape and a metal tape in addition to the paper tape. As a paper tape, for example, a material having water absorbability and hygroscopic property and a material containing water absorption powder may be adopted.

Further, a width and a thickness of the longitudinal wrap tape T that can be handled by the accumulator unit 24 in the present embodiment are not particularly limited, and for example, the accumulator unit 24 may handle the longitudinal wrap tape T having a width of substantially 10 mm to 100 mm and a thickness of substantially 0.05 to 1 mm.

As the movable rollers 45 and the fixed rollers 47 of the accumulator unit 24, rollers such as crown rollers, drum rollers, inverted crown rollers, bar rollers, or flat groove rollers are used. The roller can guide the longitudinal wrap tape T to a center of the roller in a width direction and prevent the longitudinal wrap tape T from meandering in the width direction of the roller.

The cable core C in the present embodiment is not particularly limited, and may be applied to various cable cores such as cables having twisted wires and slot rods.

2. Replacement of Bobbin

Figure 2:
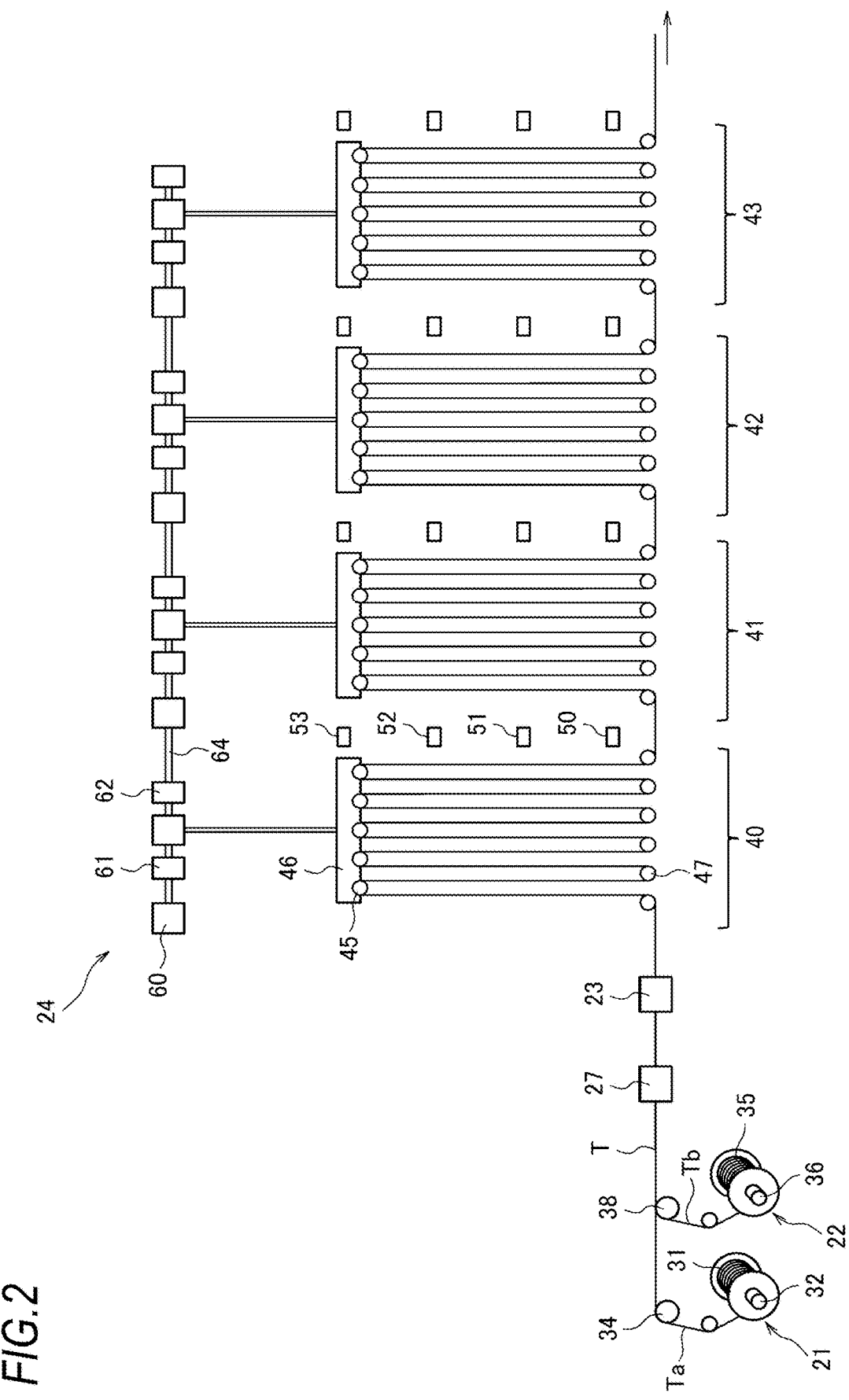
FIG. 2 shows a tape supply device.

FIG. 2 shows the tape supply device 20. The first bobbin 21 includes a shaft 32, a support portion that supports the shaft 32, and a wrapped tape 31 that is a stack of the longitudinal wrap tape T wrapped on the shaft 32. The longitudinal wrap tape Ta drawn out from the first bobbin 21 is guided by a plurality of guides 34 and supplied to the accumulator unit 24. When the remaining amount of the wrapped tape 31 is less than a predetermined amount, the shaft 32 is detached from the support portion and is replaced with the shaft 32 on which the long longitudinal wrap tape T is wrapped. The wrapped tape 31 alone may be replaced while the shaft 32 remains as it is.

Similarly, the second bobbin 22 includes a shaft 36, a support portion that supports the shaft 36, and a wrapped tape 35 that is a stack of the longitudinal wrap tape T wrapped on the shaft 36. A longitudinal wrap tape Tb drawn out from the second bobbin 22 is guided by a plurality of guides 38 and supplied to the accumulator unit 24. When the remaining amount of the wrapped tape 35 is less than a predetermined amount, the shaft 36 is detached from the support portion and is replaced with the shaft 36 on which the long longitudinal wrap tape T is wrapped. The wrapped tape 35 alone may be replaced while the shaft 36 remains as it is.

As described above, one of the first bobbin 21 and the second bobbin 22 (for example, the first bobbin 21) is a bobbin for supplying the longitudinal wrap tape T, and the other bobbin (for example, the second bobbin 22) is a bobbin for replacement. When the amount of the longitudinal wrap tape T wrapped on the first bobbin 21 is smaller than the predetermined amount, the supply of the longitudinal wrap tape T is switched to the second bobbin 22.

When the supply of the longitudinal wrap tape T is switched from the first bobbin 21 to the second bobbin 22, the longitudinal wrap tape T is first gripped by the first tape catcher 23 on the inlet side of the accumulator unit 24. Next, the longitudinal wrap tape T of the first bobbin 21 is cleaved in an exchange device 27, and the front end of the longitudinal wrap tape T of the second bobbin 22 is bonded to the rear end of the longitudinal wrap tape T gripped by the first tape catcher 23. An adhesive such as a thermosetting adhesive is used for the bonding. In the case of using the thermosetting adhesive, an adhesive is applied to the end portion of the longitudinal wrap tape T, the end portions of the two longitudinal wrap tapes T adhere to each other and then the adhesive is cured irreversibly by heating, so that the two longitudinal wrap tapes T are completely bonded.

After the bonding of the end portions of the two longitudinal wrap tapes T is completed, the grip of the longitudinal wrap tape T by the first tape catcher 23 is released, and the supply of the longitudinal wrap tape T from the second bobbin 22 to the accumulator unit 24 is restarted.

The bobbin switching operation including the bonding process of the end portions of the two longitudinal wrap tapes T can be manually performed, and a part or the whole thereof may be automatically performed by the exchange device 27 or the like.

The second bobbin 22 on which the remaining amount of the longitudinal wrap tape T is smaller than the predetermined amount is replaced with a bobbin on which the long longitudinal wrap tape T is wrapped, and is switched to the first bobbin 21 this time. In this manner, the first bobbin 21 and the second bobbin 22 are alternately switched each time the remaining amount of the longitudinal wrap tape T is smaller than the predetermined amount.

3. Overall Configuration of Accumulator Unit 24

The accumulator unit 24 includes the first tape catcher 23, the plurality of movable rollers 45, and the plurality of fixed rollers 47. The movable rollers 45 and the fixed rollers 47 are divided into a plurality of units, for example, four units in FIG. 2, and are divided into a first unit 40, a second unit 41, a third unit 42, and a fourth unit 43 in this order from the inlet side. A plurality of movable rollers 45 of each of the units 40 to 43, for example, five movable rollers 45 in FIG. 2, are rotatably fixed to a movable frame 46.

The fixed rollers 47 of each of the units 40 to 43 are rotatably fixed to a lower frame (not shown) of the accumulator unit 24. The longitudinal wrap tape T introduced from the inlet side is guided by the fixed roller 47 on a most inlet side, and then alternately passes between the movable rollers 45 and the fixed rollers 47. The longitudinal wrap tape T guided by the fixed roller 47 on a most outlet side is supplied to the outlet side.

The movable frame 46 is slidably guided by a slider (not shown) along a frame of the accumulator unit 24.

On the frame of the accumulator unit 24 are provided a plurality of, for example, four proximity switches 50 to 53 in FIG. 2, although not particularly limited thereto. The proximity switches 50 to 53 detect a position of the movable frame 46 of each of the units 40 to 43. More specifically, in the example of FIG. 2, as the proximity switches 50 to 53, the lower limit proximity switch 50, the brake release proximity switch 51, the upper deceleration proximity switch 52, and the upper limit proximity switch 53 are provided in this order from the bottom.

As shown in FIG. 1, the accumulator unit 24 of the tape supply device 20 includes a control unit that controls a supply order of the tape T from the units 40 to 43. A motor 60 is provided on an upper side of the accumulator unit 24, and a movable frame drive mechanism such as a clutch 61 and a disc brake 62 is provided for each of the units 40 to 43. The control unit controls the movable frame drive mechanism based on signals from the proximity switches 50 to 53, thereby controlling the supply order of the tape T from the units 40 to 43.

When the first unit 40 discharges the longitudinal wrap tape T, the control unit performs control to discharge the longitudinal wrap tape T of the second unit 41 next, then discharge the longitudinal wrap tape T of the third unit 42, and finally discharge the longitudinal wrap tape T of the fourth unit 43.

In this manner, in the accumulator unit 24 according to the present embodiment, the plurality of movable rollers 45 and the plurality of fixed rollers 47 are divided into a plurality of units including the first to fourth units 40 to 43 connected in series. In this manner, the accumulator unit 24 is an accumulator of a multistage unit type in which the units 40 to 43 are connected in series. Although not particularly limited, the number of turns of the longitudinal wrap tape T of each of the units 40 to 43 is five back-and-forth movements by the five movable rollers 45 and the five fixed rollers 47 in each of the units 40 to 43.

As in JP2005-126221A, when the number of back-and-forth movements of the longitudinal wrap tape T is large, the longitudinal wrap tape T may be twisted in the middle and cause poor running. In particular, when all the movable rollers are simultaneously moved to accumulate and discharge the tape in a state where the number of back-and-forth movements is large, the tension may fluctuate, and the longitudinal wrap tape T may come off the movable rollers 45 or the fixed rollers 47 and shift, fall, and loosen. In contrast, when the movable rollers or the fixed rollers 47 are divided into a plurality of units as in the present embodiment, the number of movable rollers that simultaneously move can be reduced, and the tension applied to the longitudinal wrap tape T can be stabilized. Accordingly, the longitudinal wrap tape T can be prevented from coming off the movable rollers 45 or the fixed rollers 47 or shifting, falling, or loosening, the tension can be stably applied to the longitudinal wrap tape T, and the running of the longitudinal wrap tape T can be stabilized.

In the present embodiment, each of the units 40 to 43 includes five movable rollers and five fixed rollers 47, and the number of turns of the longitudinal wrap tape T of each of the units 40 to 43 is five back-and-forth movements. In this case, the tension can be reliably and stably applied to the longitudinal wrap tape T, and the running of the longitudinal wrap tape T can be reliably stabilized. For this reason, in the present disclosure, by setting the number of turns of the longitudinal wrap tape T of each of the units 40 to 43 to five back-and-forth movements or less, tension is stably applied to the longitudinal wrap tape T, and the running of the longitudinal wrap tape T is stabilized.

4. Drive Mechanism of Movable Frame 46

Figure 3:
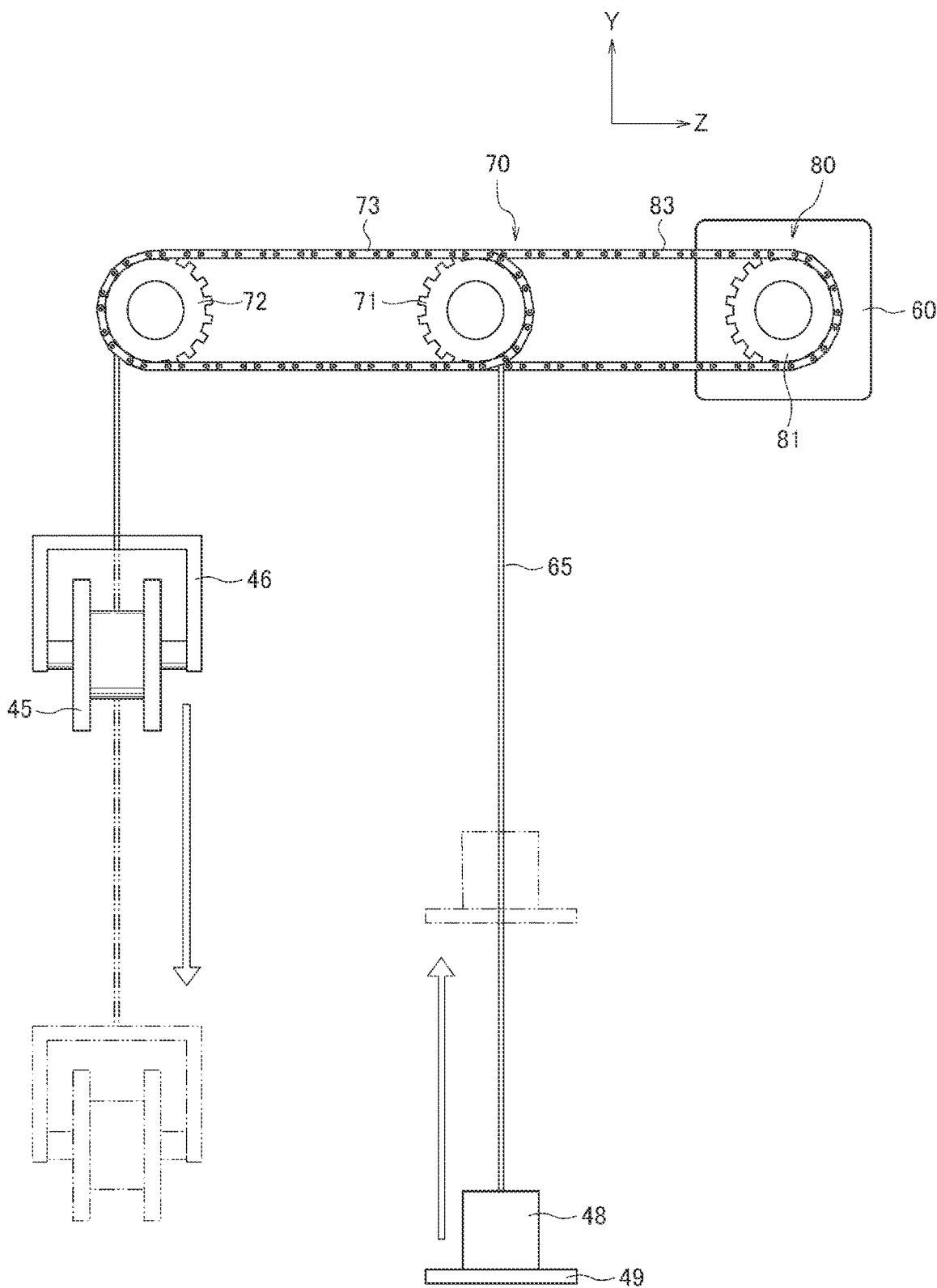
FIG. 3 is a side view of an accumulator unit.
Figure 4:
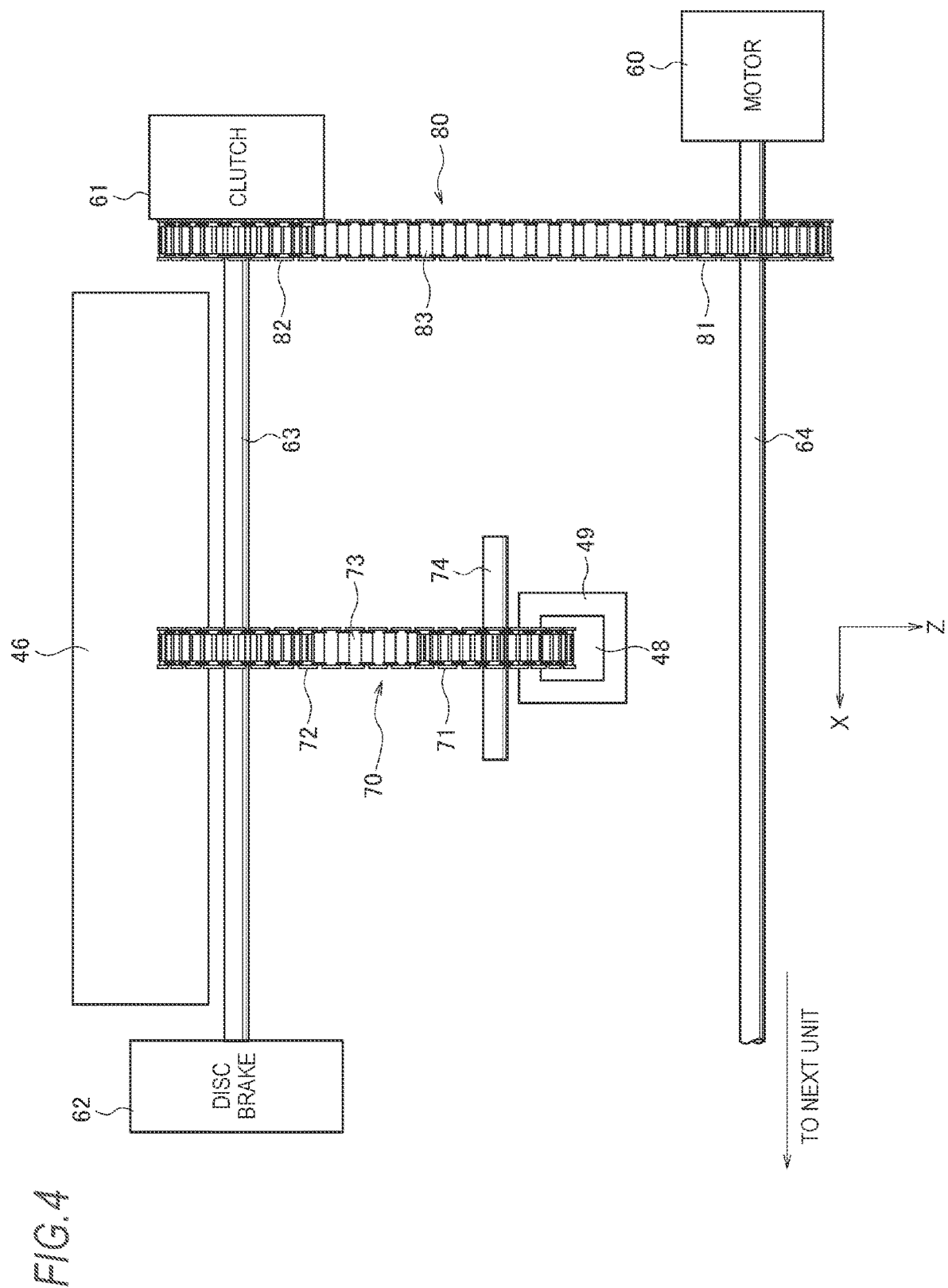
FIG. 4 is a plan view of the accumulator unit.

FIG. 3 is a side view of the accumulator unit 24. FIG. 4 is a plan view of the accumulator unit 24. A weight drive mechanism 70 includes a weight-side gear 71, a roller-side gear 72, and a roller chain 73. The movable frame 46 is coupled to a weight setting table 49 via a wire 65. The wire 65 is routed by a pulley of the weight-side gear 71 and a pulley of the roller-side gear 72, and has one end attached to the movable frame 46 and the other end to the weight setting table 49. A plurality of weights 48 may be set on the weight setting table 49, and for example, although not particularly limited, the weights 48 of 500 g may be set in four horizontal rows and eight longitudinal columns. The number of weights 48 set on the weight setting table 49 may be changed, and the weights 48 are set to be heavier than the movable frame 46 by a predetermined weight.

The roller chain 73 meshes with the weight-side gear 71 and the roller-side gear 72 and rotates in synchronization with the weight-side gear 71 and the roller-side gear 72. The weight-side gear 71 is attached to a weight-side shaft 74.

The roller-side gear 72 is attached to a roller-side shaft 63. The roller-side shaft 63 has one end attached to the disc brake 62 and the other end to the clutch 61. The roller-side shaft 63 rotates integrally with the roller-side gear 72, and the rotation of the roller-side shaft 63 is transmitted to the clutch 61 and the disc brake 62. The clutch 61 can transmit rotation of a clutch-side gear 82 to the roller-side shaft 63 and disconnect the rotation of the roller-side shaft 63.

A motor drive mechanism 80 includes a motor-side gear 81, the clutch-side gear 82, and a motor chain 83. The motor chain 83 meshes with the clutch-side gear 82 and the motor-side gear 81. The motor-side gear 81 is attached to a motor-side shaft 64 driven by the motor 60. A drive force of the motor 60 is transmitted to the roller-side shaft 63 via the motor-side gear 81, the motor chain 83, the clutch-side gear 82, and the clutch 61. The motor-side shaft 64 is provided over all the units to transmit the power of the motor 60 to all the units. Alternatively, each of the units may be provided with a motor.

A drive force acts on the movable frame 46 such that the movable frame 46 is lifted by the weight 48 set on the weight setting table 49. That is, when the disc brake 62 is released, the drive force for lifting the movable frame 46 by the weight 48 acts on the movable frame 46 while the tension of the longitudinal wrap tape T acts on the movable frame 46 in a descending direction via the movable rollers 45. In the unit that discharges the longitudinal wrap tape T in a state in which the longitudinal wrap tape T is gripped by the first tape catcher 23, a drive force acting on the movable frame 46 in the descending direction via the movable roller 45 due to the tension of the longitudinal wrap tape T is larger than the drive force for lifting the movable frame 46 by the weight 48. For this reason, the movable frame 46 descends while discharging the longitudinal wrap tape T and is fixed by operating the disc brake 62 in a lower limit position. When the movable frame 46 of one unit reaches a brake release position by the brake release proximity switch 51, the disc brake 62 of the next unit is released, so that the movable frames 46 of all the units are not fixed simultaneously. For example, when the movable frame 46 of the first unit 40 reaches the brake release position by the brake release proximity switch 51, the disc brake 62 of the second unit 41 is released.

When the unit that discharges the longitudinal wrap tape T is switched, the disc brakes 62 of two units are released. At this time, the weights 48 set on the weight setting tables 49 of the units 40 to 43 are set to have different amounts (weights) so that the longitudinal wrap tape T can be discharged from one unit first. A weight difference between the weights 48 of the first unit 40 and the second unit 41 is set such that the weight 48 of the second unit that discharges the longitudinal wrap tape T later is heavier than the weight 48 of the first unit 40. Although not particularly limited, the weight difference of the weights 48 between the first unit 40 and the second unit 41 is set at substantially 5%. Similarly, the weight difference of the weights 48 between the second unit 41 and the third unit 42 and between the third unit 42 and the fourth unit 43 is set at substantially 5%.

When the bobbin switching is completed and the grip of the longitudinal wrap tape T by the first tape catcher 23 is released and the supply of the longitudinal wrap tape T to the accumulator unit 24 is restarted, to store the longitudinal wrap tape T in the accumulator unit 24, the motor 60 is driven and the clutch 61 is connected to the roller-side shaft 63, so that the movable frame 46 is lifted in the ascending direction by the drive force of the motor 60.

5. Control of Movable Frame 46 by Control Unit

During the replacement of the bobbin, the longitudinal wrap tape T is gripped by the first tape catcher 23. The disc brake 62 of the first unit 40 is released at the same time as or before the first tape catcher 23 grips the longitudinal wrap tape T. When the disc brake 62 of the first unit is released, the tension of the longitudinal wrap tape T acts on the movable frame 46 in the descending direction via the movable rollers 45, and thus the movable frame 46 descends against the weight of the weight 48, and the first unit 40 discharges the longitudinal wrap tape T stored between the movable rollers 45 and the fixed rollers 47 at the same time.

In the present embodiment, the control unit controls the movable frame drive mechanism, that is, the weight drive mechanism 70 and the motor drive mechanism 80, based on signals from the proximity switches 50 to 53, thereby controlling the supply order of the longitudinal wrap tape T from the units 40 to 43. When the first unit 40 discharges the longitudinal wrap tape T, the control unit performs control to discharge the longitudinal wrap tape T of the second unit 41 next, then discharge the longitudinal wrap tape T of the third unit 42, and finally discharge the longitudinal wrap tape T of the fourth unit 43.

When the brake release proximity switch 51 of the first unit 40 detects that the movable frame 46 reaches the brake release position of the next unit, the disc brake 62 of the second unit 41 is released. At this time, since the weight 48 of the second unit 41 is set to be heavier than the weight 48 of the first unit 40, the first unit 40 continues to descend, and the longitudinal wrap tape T is discharged first from the first unit 40.

When the lower limit proximity switch 50 of the first unit 40 detects that the movable frame 46 reaches a lower limit proximity, the control unit controls the disc brake 62 of the first unit 40 to fix the movable frame 46 of the first unit 40.

Next, when the brake release proximity switch 51 of the second unit 41 detects that the movable frame 46 reaches the brake release position of the next unit, the disc brake 62 of the third unit 42 is released. Thereafter, similar to the switching from the first unit 40 to the second unit 41, the switching from the second unit 41 to the third unit 42 and then from the third unit 42 to the fourth unit 43 is performed.

When the control unit switches the units, that is, when the brake release proximity switch 51 detects that the movable frame 46 reaches the brake release position of the next unit, the disc brake 62 of the next unit is released. Accordingly, the disc brakes 62 of two units can be prevented from operating simultaneously. Accordingly, all the movable frames 46 can be prevented from being locked at the same time, and thus the tension of the longitudinal wrap tape T can be prevented from rapidly increasing, and the running of the longitudinal wrap tape T can be stabilized.

When the switching of the bobbin is completed, the control unit releases the grip of the longitudinal wrap tape T by the first tape catcher 23, and the supply of the longitudinal wrap tape T to the accumulator unit 24 is restarted. To store the longitudinal wrap tape T in the accumulator unit 24, the motor 60 is driven and the clutch 61 is connected to the roller-side shaft 63, so that the movable frame 46 is lifted in the ascending direction by the drive force of the motor 60. The movable frame 46 is lifted in the order of the fourth unit 43, the third unit 42, the second unit 41, and the first unit 40. Although the load by the weight 48 is applied to the movable frame 46 in the ascending direction, the movable frame 46 cannot be pulled up reliably and stably by the load alone by the weight 48 in relation to the tension by the longitudinal wrap tape T. Then, the movable frame 46 can be stably pulled up by lifting the movable frame 46 in the ascending direction by the drive force of the motor 60.

The control unit releases the disc brake 62 of the fourth unit 43, drives the motor 60, connects the clutch 61 to the roller-side shaft 63, and thereby the movable frame 46 of the fourth unit 43 is lifted in the ascending direction by the drive force of the motor 60. When the upper deceleration proximity switch 52 of the fourth unit 43 detects that the movable frame 46 reaches a deceleration position, the control unit reduces the rotation speed of the motor 60 to reduce the ascending speed of the movable frame 46. Next, when the upper limit proximity switch 53 of the fourth unit 43 detects that the movable frame 46 reaches an upper limit position, the control unit operates the disc brake 62, disconnects the clutch 61, and fixes the movable frame 46 of the fourth unit 43. Before the movable frame 46 is locked, that is, when the upper deceleration proximity switch 52 detects that the movable frame 46 reaches the deceleration position, the control unit reduces the rotation speed of the motor 60 to reduce the ascending speed of the movable frame 46. Accordingly, a rapid ascending speed of the movable frame 46 is prevented, so that the running of the longitudinal wrap tape T can be stabilized.

Next, the control unit releases the disc brake 62 of the third unit 42, drives the motor 60, connects the clutch 61 to the roller-side shaft 63, and thereby the movable frame 46 of the fourth unit 43 is lifted in the ascending direction by the drive force of the motor 60. Thereafter, similar to the case of the fourth unit 43, the longitudinal wrap tape T is stored in the units 40 to 43 in the order of the third unit 42, the second unit 41, and the first unit 40. When the switching of the bobbin is completed and the supply of the longitudinal wrap tape T to the accumulator unit 24 is restarted and the movable frame 46 of the fourth unit 43 reaches the upper limit position, the control unit performs control to ascend the movable frame 46 of the third unit 42. Similarly, when the third unit 42 reaches the upper limit position, the control unit performs control to ascend the movable frame 46 of the second unit 41. When the second unit 41 reaches the upper limit position, the control unit performs control to ascend the movable frame 46 of the first unit 40, and stores the longitudinal wrap tape T in the units 40 to 43.

Second Embodiment

A tape supply device, an optical cable manufacturing apparatus, and an optical cable manufacturing method according to a second embodiment of the present disclosure will be described. The tape supply device, the optical cable manufacturing apparatus, and the optical cable manufacturing method according to the second embodiment are different from the tape supply device, the optical cable manufacturing apparatus, and the optical cable manufacturing method according to the first embodiment in the order in which the longitudinal wrap tape T is supplied from the units 40 to 43 when the longitudinal wrap tape T is supplied from the accumulator unit 24 in a state in which the longitudinal wrap tape T is gripped by the first tape catcher 23.

In the first embodiment, when the first unit 40 discharges the longitudinal wrap tape T, the control unit performs control to discharge the longitudinal wrap tape T of the second unit 41 next, then discharge the longitudinal wrap tape T of the third unit 42, and finally discharge the longitudinal wrap tape T of the fourth unit 43. In contrast, in the present embodiment, when the fourth unit 43 first discharges the longitudinal wrap tape T, the control unit performs control to discharge the longitudinal wrap tape T of the third unit 42 next, then discharge the longitudinal wrap tape T of the second unit 41, and finally discharge the longitudinal wrap tape T of the first unit 40.

Since the fourth unit 43 is a unit closest to the outlet of the accumulator unit 24, the movable rollers 45 and the fixed rollers 47 of the first to third units 40 to 42 are in a stopped state when the longitudinal wrap tape T is discharged from the fourth unit 43. When the longitudinal wrap tape T is controlled to be discharged from the fourth unit 43 first, the number of the rotating movable rollers 45 and fixed rollers 47 is limited to the minimum, and thus the longitudinal wrap tape T can be more easily prevented from coming off the movable rollers 45 or the fixed rollers 47 or shifting, falling, or loosening. Accordingly, the tension can be more stably applied to the longitudinal wrap tape T and the running of the longitudinal wrap tape T can be further stabilized.

Also in the present embodiment, when the bobbin switching is completed and the supply of the longitudinal wrap tape T to the accumulator unit 24 is restarted, to store the longitudinal wrap tape T in the accumulator unit 24, the motor 60 is driven and the clutch 61 is connected to the roller-side shaft 63, so that the movable frame 46 is lifted by the drive force of the motor 60 in the ascending direction. At this time, the movable frame 46 is lifted in the order of the first unit 40, the second unit 41, the third unit 42, and the fourth unit 43.

Although the embodiments of the present disclosure are described above, these embodiments are examples of a method and an apparatus for manufacturing an optical cable for embodying the technical idea of the present disclosure, and the present disclosure is not limited thereto. The present disclosure can be equally applied to other embodiments, a part of the embodiments can be omitted, added, or changed, and aspects of the embodiments can be combined.

What is claimed is:

1. A tape supply device that supplies a tape to an optical cable, the tape supply device comprising:
   an accumulator unit of a multistage unit type divided into units, each of the units including a plurality of movable rollers and a plurality of fixed rollers, the units being connected in series; and
   a control unit configured to control a supply order of the tape from the units, wherein
   each of the units includes a brake configured to stop the movable rollers, and
   when the units are switched, the control unit performs control such that the brakes of two of the units before and after the switching do not operate simultaneously.

2. The tape supply device according to claim 1, wherein the tape is a longitudinal wrap tape.

3. The tape supply device according to claim 1, wherein the movable rollers of each of the units are attached to a weight that controls tension of the tape, and
   the weight of each of the units differs in weight.

4. The tape supply device according to claim 1, wherein the number of turns of the tape by the movable rollers and the fixed rollers of each of the units is five back-and-forth movements or less.

5. An optical cable manufacturing apparatus using the tape supply device according to claim 1.

6. An optical cable manufacturing method using the tape supply device according to claim 1.

* * * * *